(12) United States Patent
Kano

(10) Patent No.: US 8,866,937 B2
(45) Date of Patent: Oct. 21, 2014

(54) IMAGE PROCESSING APPARATUS, IMAGE PROCESSING METHOD, AND PROGRAM

(75) Inventor: Akira Kano, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 179 days.

(21) Appl. No.: 13/489,287

(22) Filed: Jun. 5, 2012

(65) Prior Publication Data

US 2012/0320240 A1  Dec. 20, 2012

(30) Foreign Application Priority Data

Jun. 14, 2011 (JP) ................................. 2011-132376
May 11, 2012 (JP) ................................. 2012-109907

(51) Int. Cl.
*H04N 5/217* (2011.01)
*H04N 5/235* (2006.01)
*G06K 9/40* (2006.01)
*H04N 5/357* (2011.01)

(52) U.S. Cl.
CPC .................................. *H04N 5/3572* (2013.01)
USPC ......... 348/241; 348/222.1; 382/254; 382/275

(58) Field of Classification Search
CPC ........ G06T 5/003; G06T 5/006; H04N 9/045; H04N 5/3572
USPC ........................... 348/241, 222; 382/254, 275
See application file for complete search history.

(56) References Cited

U.S. PATENT DOCUMENTS

2001/0008418 A1* 7/2001 Yamanaka et al. ............ 348/222
2011/0128421 A1* 6/2011 Yahata .......................... 348/241

FOREIGN PATENT DOCUMENTS

JP    10-165365 A    6/1998

* cited by examiner

*Primary Examiner* — Twyler Haskins
*Assistant Examiner* — Padma Haliyur
(74) *Attorney, Agent, or Firm* — Canon USA Inc IP Division

(57) ABSTRACT

Provided is an image processing apparatus that reduces over recovery of image data by image recovery processing. An image processing unit selects an image recovery filter corresponding to an imaging condition and performs image recovery processing on captured image data using the image recovery filter. Further, the image processing unit limits a change amount of a pixel signal value of the image data by the image recovery processing based on a change amount limit value determined according to characteristics of a gamma correction processing that is applied after the image recovery processing.

12 Claims, 11 Drawing Sheets

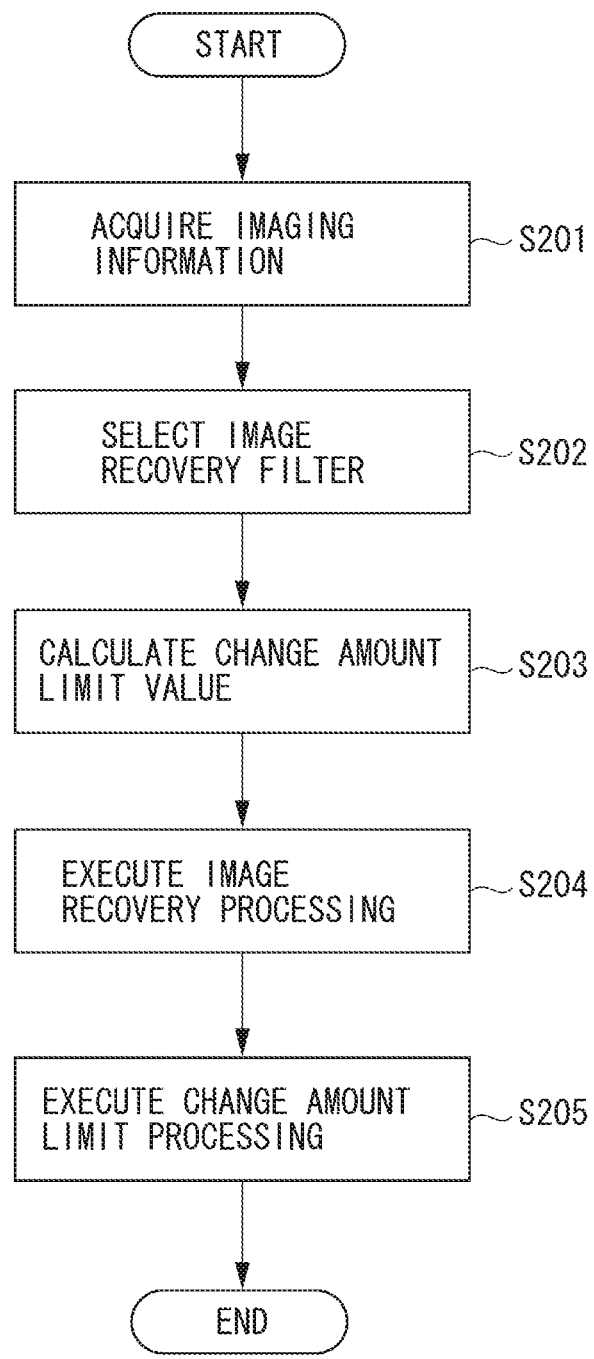

IMAGE PROCESSING APPARATUS, IMAGE PROCESSING METHOD, AND PROGRAM

BACKGROUND OF THE INVENTION

1. Field of the Invention

The present invention relates to an image recovery processing technology that uses an image recovery filter.

2. Description of the Related Art

Various methods have been proposed for performing correction processing on image data. When generating image data by capturing an object with a digital camera, the obtained image data is at least partially deteriorated due to aberration in the imaging optical system.

A blur component in image data is a factor in optical system spherical aberration, coma aberration, curvature of field, astigmatism and the like. When an ideal optical system that is free of aberration and does not suffer any effects of diffraction is used, the light beams coming from a single point of the object that should reconverge at a single point on the imaging plane in fact form an image in which the light beams do not converge at a single point, and are spread out. The distribution of these spread out light beams is the blur component. Although in optics this is referred to as "point spread function" (PSF), for image data we will refer to this as "blur component". Further, although the term blur component of image data can also refer to blurred image data that is not in focus, for example, here this term is used to refer to blurring due to the effects of aberration in the optical system even when the image is in focus. Further, the fact that optical system axial chromatic aberration, color spherical aberration and color coma aberration are factors can be said to be due to differences in the blur component at each light wavelength.

An example of a known method to correct deterioration of the blur component in image data is to use information about the imaging optical system optical transfer function (OTF). Although this method is referred to using names such as image recovery and image restoration, in the following description processing that corrects deterioration of image data using information about OTF of the imaging optical system will be referred to as image recovery processing.

An outline of image recovery processing will now be described. When deteriorated image data is represented as $g(x,y)$, the original image data as $f(x,y)$, and a PSF obtained from an inverse Fourier transform on the optical transfer function as $h(x,y)$, the following equation holds.

$$g(x,y)=h(x,y)*f(x,y)$$

Where * represents convolution and (x,y) represents image data coordinates.

Further, if the equation is subjected to a Fourier transform and converted into a display format at a frequency plane, the resultant equation is in the form of an integral for each frequency, as illustrated below. In this equation, since H is obtained by subjecting a PSF to a Fourier transform, H is an OTF. Further, (u,v) represents coordinates in a two-dimensional frequency plane, i.e., represents the frequency.

$$G(u,v)=H(u,v)\cdot F(u,v)$$

To obtain the original image data from the deteriorated image data, first, both sides are divided by H, as follows.

$$G(u,v)/H(u,v)=F(u,v)$$

Then, the original image data $f(x,y)$ is obtained as a recovered image by subjecting the $F(u,v)$ to an inverse Fourier transform to return to the actual plane.

If the value obtained by subjecting 1/H in the above formula to an inverse Fourier transform is R, the original image data can similarly be obtained by performing convolution processing on the image data in the actual plane as illustrated in the following equation.

$$g(x,y)*R(x,y)=f(x,y)$$

This $R(x, y)$ is called an image recovery filter. Since the OTF varies according to the imaging state, such as the state of the zoom position and the state of the aperture diameter, the image recovery filter to be used in image recovery processing also needs to be changed according to the OTF. For example, Japanese Patent Application Laid-Open No. 10-165365 discusses a technique for resolving image blur by using a PSF corresponding to a used fluorescence wavelength for a range that is outside of the focus range of the imaging means in an endoscope for observing inside the body. Since the fluorescence is faint, an object optical system having a small F number is needed. Since the focal depth becomes more shallow if an object optical system having a small F number is used, this technique is trying to obtain an in-focus image by performing image recovery processing on a range that is out of focus.

As described above, image quality can be improved by performing image recovery processing on captured image data and correcting various aberrations. However, in actual imaging, the imaging state of the image data and the state of the image recovery filter for recovery of the image data may not completely match. An example of such a case is when there is a saturated pixel in the captured image data. Since a saturated pixel has lost its original object information, a situation arises in which the deterioration state of the image data to be actually obtained and the deterioration state of the image data that is envisaged as the recovery target by the image recovery filter do not match.

Further, when selecting or generating an image recovery filter according to imaging information such as the lens focal length, the aperture value, and the imaging distance, a difference can occur between the actual imaging state and the imaging information to be used. A situation in which the deterioration state of the image data to be actually obtained and the deterioration state of the image data that is envisaged as the recovery target by the image recovery filter do not match tends to occur especially for imaging distance, because the object distance differs depending on the angle of view when capturing a three-dimensional object.

In particular, when the actually obtained image data is sharper than the image data envisaged as the recovery target by the image recovery filter, if the image recovery filter is used, the recovered image data becomes over-recovered, which causes image deterioration such as undershoot and overshoot at the edge portions. In particular, undershoot at a low luminance portion is amplified by the gamma correction processing that is applied after image recovery processing, so that the resultant image data looks strange.

Further, even in the technique discussed in Japanese Patent Application Laid-Open No. 10-165365, when there is a difference between the envisaged PSF and the actually obtained image data, over recovery occurs, which can be thought to lead to deterioration in the quality of the recovered image data.

SUMMARY OF THE INVENTION

The present invention is directed to providing an image processing apparatus that reduces over recovery of image data by image recovery processing.

According to an aspect of the present invention, an image processing apparatus includes an image recovery processing unit configured to perform image recovery processing on image data captured by an imaging unit using an image recovery filter corresponding to an imaging condition in the imaging unit, and a limiting unit configured to limit a change amount of a signal value of the image data by the image recovery processing based on a change amount limit value determined according to characteristics of a gamma correction processing that is applied after the image recovery processing.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 2 is a flowchart illustrating image recovery processing that is executed by an image recovery processing unit according to a first exemplary embodiment of the present invention.

DESCRIPTION OF THE EMBODIMENTS

Various exemplary embodiments, features, and aspects of the invention will be described in detail below with reference to the drawings.

Figure 1:
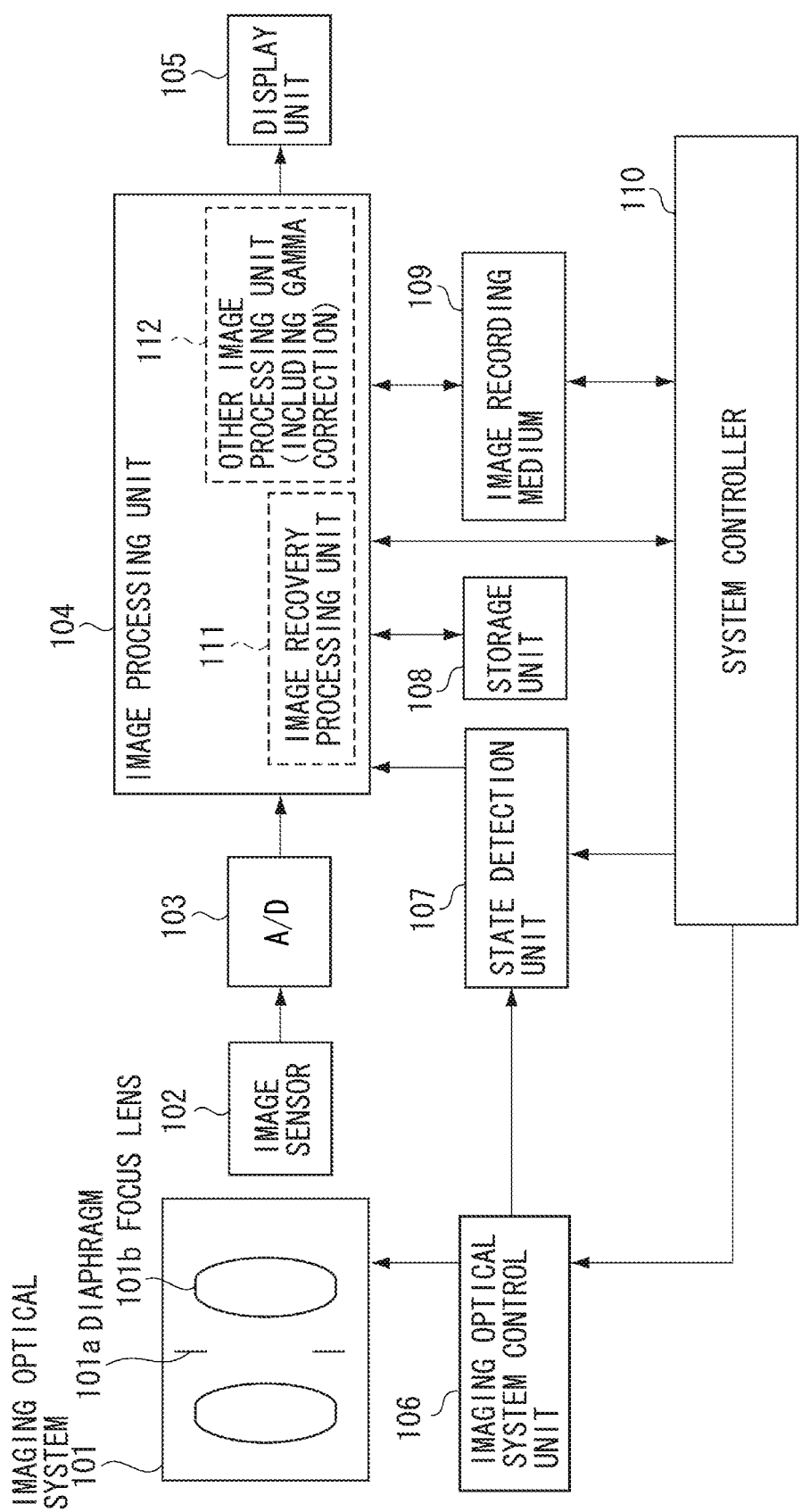
FIG. 1 illustrates a configuration of an imaging apparatus according to an exemplary embodiment of the present invention.

FIG. 1 illustrates a configuration of an imaging apparatus according to an exemplary embodiment of the present invention. In the imaging apparatus according to the present exemplary embodiment illustrated in FIG. 1, an imaging optical system 101 forms an object image on an image sensor 102. The imaging optical system 101 includes a diaphragm 101a which controls the aperture diameter and a focus lens 101b for performing focus adjustment. The image sensor 102 converts the object image formed by the imaging optical system 101 into an electric signal. An A/D converter 103 converts the electric signal output from the image sensor 102 into a digital signal, and outputs the digital signal to an image processing unit 104 as image data. The image processing unit 104 is configured from an image recovery processing unit 111 that performs image recovery processing and another image processing unit 112 that performs gamma correction processing and the like. The image recovery processing is performed on image data that has not yet been subjected to gamma correction. Gamma correction is performed on image data that has been subjected to image recovery.

The image processing unit 104 acquires imaging information about the imaging apparatus from state detection unit 107. The imaging information includes, for example, lens focal length, aperture value, and imaging distance. The image recovery processing unit 111 selects from a storage unit 108 an image recovery filter corresponding to the imaging information acquired from the state detection unit 107, and then using the image recovery filter, performs image recovery processing on the image data input into the image processing unit 104. The state detection unit 107 can acquire all of the imaging information relating to the imaging apparatus from a system controller 110, or can separately acquire the imaging information relating to the imaging optical system 101, among the imaging information relating to the imaging apparatus, from an imaging optical system control unit 106. The system controller 110 performs integrated control of the entire imaging apparatus. The imaging optical system control unit 106 controls the imaging optical system 101 according to instructions from the system controller 110. The storage unit 108 stores an image recovery filter for each piece of imaging information. An image recording medium 109 stores image data processed by the image processing unit 104. A display unit 105 displays image data processed by the image processing unit 104 according to instructions from the system controller 110.

Next, image recovery processing executed by the image recovery processing unit 111 will be described with reference to FIG. 2. In step S201, the image recovery processing unit 111 acquires imaging information about the imaging apparatus from the state detection unit 107. In step S202, the image recovery processing unit 111 selects from the storage unit 108 an image recovery filter suited to an imaging condition of the imaging apparatus based on the acquired imaging information. At this point, the selected image recovery filter can be corrected as necessary, or a new image recovery filter can be generated by interpolation using a plurality of selected image recovery filters. In order to reduce the data amount of the image recovery filter to be prepared in advance in the storage unit 108, data that corresponds to a discrete imaging apparatus imaging condition is prepared in the storage unit 108 and then an image recovery filter that corresponds to the imaging condition when the image recovery processing is actually executed is generated using the prepared data.

Figure 3A:
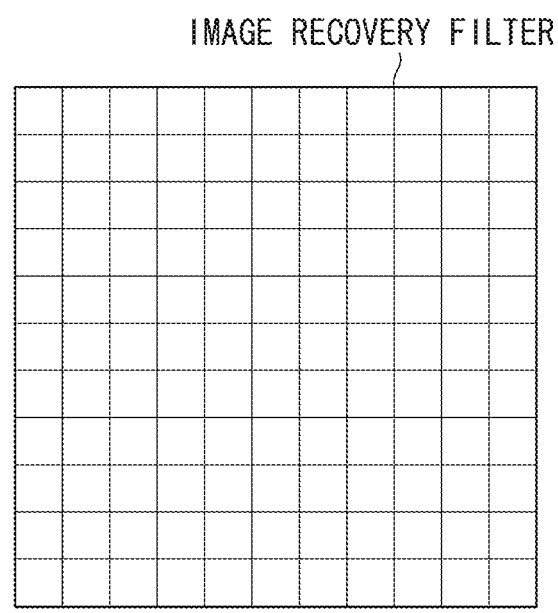
FIG. 3A illustrates an image recovery filter configured from a two-dimensional filter.
Figure 3B:
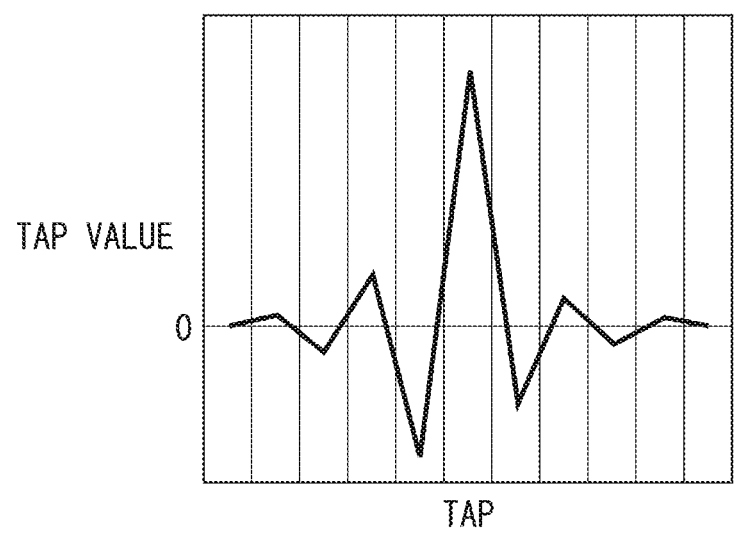
FIG. 3B illustrates an example of a weighting coefficient of an image recovery filter tap.

FIGS. 3A and 3B illustrate an image recovery filter. An image recovery filter can determine a tap number according to an aberration amount in an imaging optical system. In the present exemplary embodiment, an 11×11-tap two-dimensional filter is used. Each tap in the image recovery filter corresponds to one pixel of the image data.

As illustrated in FIG. 3A, aberration spread over a wide area from where a beam of light should form an image, such as spherical aberration, coma aberration, axial chromatic aberration, and off-axis chromatic flare resulting from the imaging optical system 101, can be recovered from by using a two-dimensional filter that is divided into 100 or more sections as an image recovery filter. Further, by performing convolution processing on the image recovery filter in such a real space for the image data to be input, the image data can be recovered without performing a Fourier transform in the imaging apparatus.

In FIG. 3A, although the value of the weighting coefficient in each tap is omitted, the value of the weighting coefficient of a tap in a certain cross-section of the image recovery filter is illustrated in FIG. 3B. The image recovery filter can be obtained by calculating or measuring the OTF of the imaging optical system 101, and performing an inverse Fourier transform on the inverse of the OTF. However, since actual image data has a noise component, if an image recovery filter produced by taking the inverse of the OTF is used, the noise component is amplified, so that good image data cannot be obtained. Therefore, the recovery rate on the high-frequency side of the image data is suppressed according to the strength ratio between the image component and the noise component using a Wiener filter, for example.

Further, the OTF can also include not only factor(s) of the imaging optical system 101, but factors that cause the image data input into the image processing unit 104 to deteriorate. For example, a low-pass filter suppresses the high-frequency component in the frequency characteristics of the OTF. Further, the shape and the aperture ratio of the pixel aperture of the image sensor also have an effect on the frequency characteristics. Other examples include the spectral characteristics of the light source and the spectral characteristics of various wavelength filters. It is desirable to produce the image recovery filters based on abroad definition of the OTF, which was calculated or measured taking these factors into account.

When the image data is red, green, blue (RGB) color image data, three image recovery filters can be produced corresponding to the respective color components of R, G, and B. Since there is color aberration in the imaging optical system 101 and the blur is different for each color component, the characteristics of each color component image recovery filter are slightly different based on the color aberration. In other words, the value of the weighting coefficient of a tap in a certain cross-section of the image recovery filter illustrated in FIG. 3B differs among color components. The image recovery filters do not have to be a square array with the same number of vertical and horizontal taps. The number of taps may be arbitrarily changed in consideration of the convolution processing.

Figure 4A:
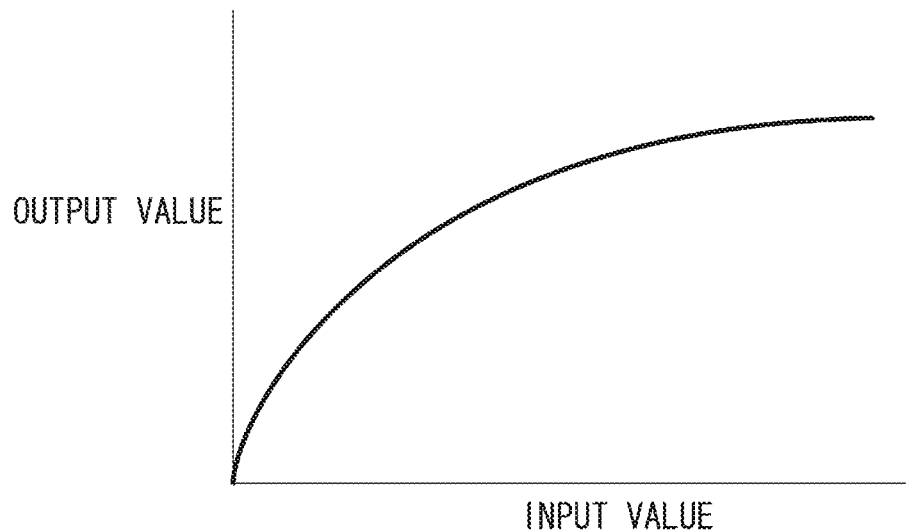
FIG. 4A illustrates input/output characteristics of gamma correction.

Returning to the description of the flowchart illustrated in FIG. 2, in step S203, the image recovery processing unit 111 calculates a limit value of a change amount by image recovery processing for each pixel. The limit value is calculated based on a pixel signal value of before image recovery processing and a gamma correction characteristics to be applied after the image recovery processing. The gamma correction is a correction process for adjusting the signal value acquired by the image sensor 102 and the A/D converter 103 according to brightness. The input/output characteristics in gamma correction generally have a shape like that illustrated in FIG. 4A. As is clear from the shape, change in the signal value before gamma correction is amplified on the low luminance side, and attenuated on the high luminance side. In other words, the change amount in a pixel signal value by image recovery processing is amplified on the low luminance side and attenuated on the high luminance side owing to gamma correction performed after image recovery processing.

In step S203, the change amount limit value is calculated by absorbing (taking into account) the difference between the amplification and attenuation for each level of the pixel signal value obtained from the gamma correction so that the maximum value of the pixel signal value change amount is constant even after gamma correction.

Figure 4B:
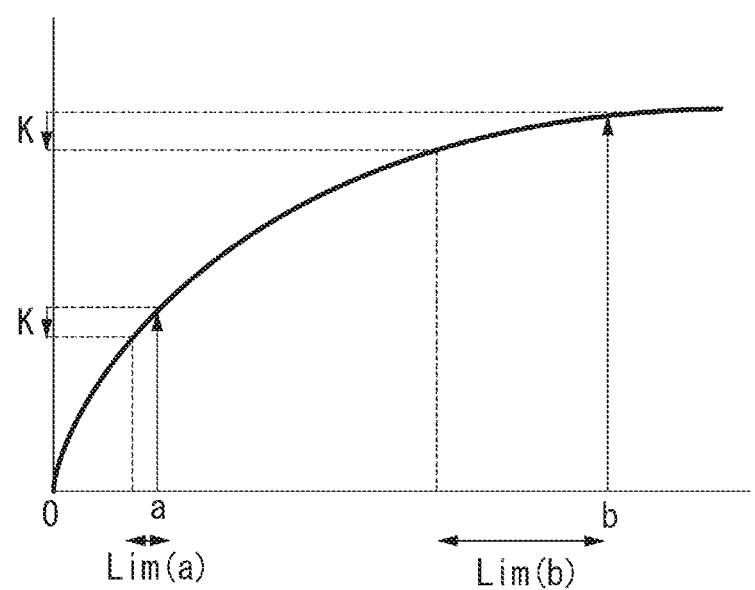
FIG. 4B illustrates a method for calculating a change amount limit value.
Figure 4C:
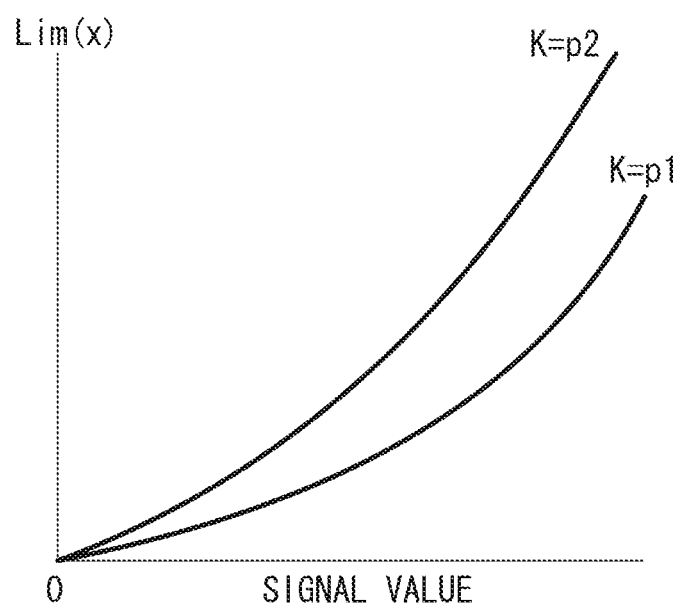
FIG. 4C illustrates limit value characteristics with respect to pixel signal value.

The method for calculating the change amount limit value will now be described in more detail using FIG. 4B. A case will be considered for the signal values a and b of two pixels before gamma correction. The signal value a is smaller than the signal value b. The signal value a is positioned on the low luminance side, and the signal value b is positioned on the high luminance side. In this example, the signal values of the two pixels are respectively permitted to only decrease by a value K in a state after gamma correction. In this case, in the state before gamma correction, the permitted range of decrease in the pixel signal value for the signal value of pixel a is represented as Lim (a) in FIG. 4B. On the other hand, the permitted range of decrease in the pixel signal value for the signal value of pixel b is represented as Lim (b) in FIG. 4B. As is clear from FIG. 4B, the permitted range Lim (a) for the low luminance side a is smaller than the permitted range Lim (b) for the high luminance side b. Thus, a change amount limit value that gives consideration to gamma correction is calculated from the permitted change amount K for a state after gamma correction. FIG. 4C illustrates an example in which the change amount limit value is calculated for each pixel level. As illustrated in FIG. 4C, the change amount limit value characteristics are different according to the value of K. In the example illustrated in FIG. 4C, the change amount limit value when K=p2 is greater than the change amount limit value when K=p1, where p2 is greater than p1 in value. The permitted change amount K is set by experimentally determining in advance the likelihood of over recovery occurring in the image recovery processing and the level of over recovery in the series of image recovery processes including the imaging optical system 101, the image sensor 102 and the image processing unit 104.

Figure 4D:
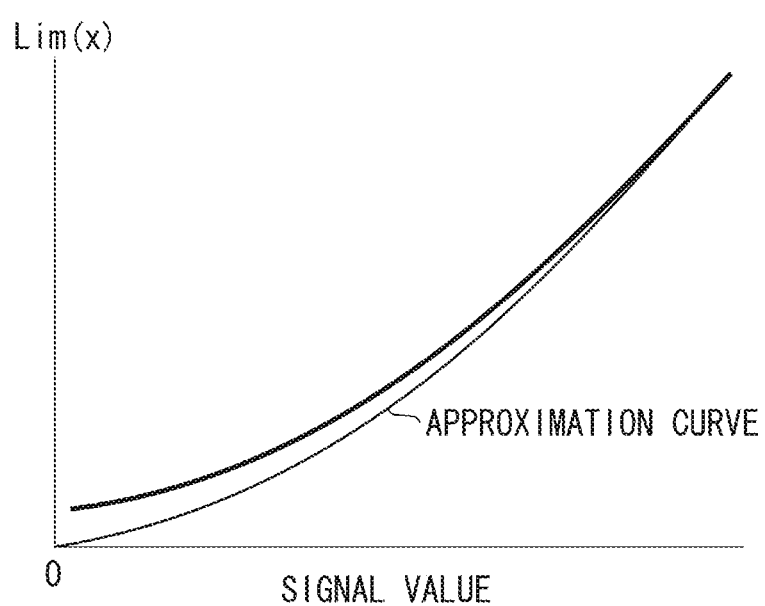
FIG. 4D is an expanded diagram of near the origin in FIG. 4C.

FIG. 4D illustrates an example in which the origin vicinity relating to one of the change amount limit values in FIG. 4C has been expanded. In the above-described method for calculating the change amount limit value that gives consideration to the gamma characteristics, Lim (x) may not converge to 0 when the pixel signal value converges to 0. In such a case, as illustrated in FIG. 4D, the limit value in the vicinity of the origin can be determined based on an approximation curve of the change amount limit value that passes through the origin. Alternatively, the change amount limit value in the vicinity of the origin can also be determined by drawing a straight line that passes through the origin and touches the change amount limit value.

Although it is desirable for the gamma characteristics used in step S203 to correspond to the image sensor used in the imaging, a gamma characteristics model that has a similar gamma characteristics shape may also be used. Further, the change amount limit value can be calculated in advance, or can be calculated during the image recovery processing. When calculating in advance, the change amount limit value for a pixel signal value is stored in the form of a table or a function, and the change amount limit value is acquired according to the pixel signal value.

Returning to the description of the flowchart illustrated in FIG. 2, in step S204, the image recovery processing unit 111 performs convolution processing on the captured image data using the image recovery filter obtained in step S202. Consequently, the blur component in the image data due to aberration that occurred in the imaging optical system can be removed or reduced. Moreover, by using an image recovery filter that is suited to each RGB color component, color aberration can also be corrected.

Figure 5A:
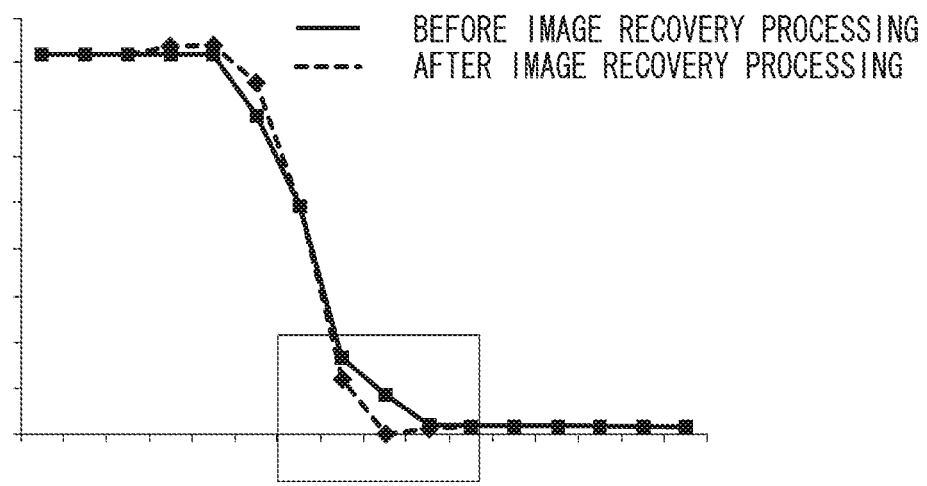
FIG. 5A illustrates an example of image data before and after image recovery processing.
Figure 5B:
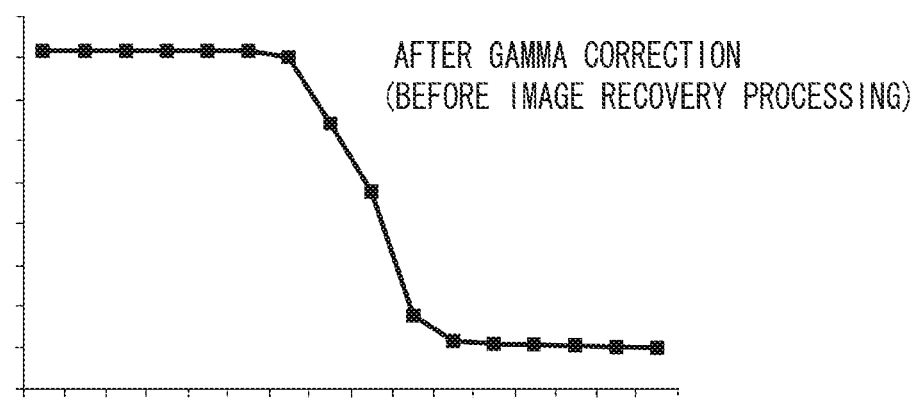
FIG. 5B illustrates an example of image data after gamma correction has been performed on image data of before image recovery processing.
Figure 5C:
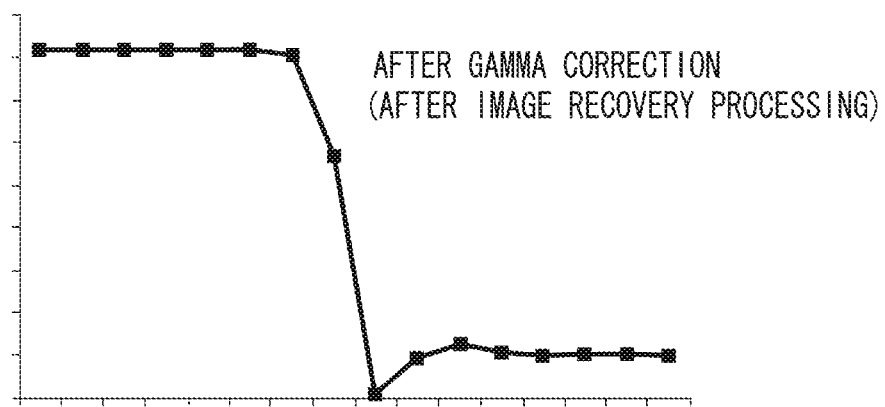
FIG. 5C illustrates an example of image data after gamma correction has been performed on image data of after image recovery processing.

In the image recovery processing, if the deterioration state of the image data that is envisaged as the recovery target by the image recovery filter does not match the actually obtained image data, this can result in over recovery. FIG. 5A illustrates the state of an edge portion of image data as an example in which a saturated image portion has become over recovered. As illustrated by the rectangular enclosed portion in FIG. 5A, there is a section in which undershoot has occurred due to over recovery in a part of the portion. FIG. 5B illustrates a state in which gamma correction has been performed on image data of before image recovery processing. FIG. 5C illustrates a state in which gamma correction has been performed on image data of after image recovery processing. As illustrated in FIG. 5C, the undershoot portion of the image data of after image recovery processing is amplified by gamma correction, and can be prominently confirmed. This is manifested as deterioration in the image quality or as the image looking strange.

Therefore, in step S205, the image recovery processing unit 111 performs limiting processing of the change amount to reduce over recovery. The image recovery processing unit 111 adjusts the value based on the change amount limit value calculated in step S203. In this example, the pixel signal value of before image recovery processing (the pre-image-recovery-processing signal value) is P0, the pixel signal value of after image recovery processing (the post-image-recovery-processing signal value) is P1, and the change amount limit value of the pixel signal value P0 is Lim (P0). If the difference between the pixel signal value P0 of before image recovery processing and the pixel signal value P1 of after image recovery processing is greater than the change amount limit value Lim (P0) of the pixel signal value P0, a pixel signal value P2 of after change amount limiting processing is a value obtained by subtracting the change amount limit value Lim (P0) of the pixel signal value P0 from the pixel signal value P0 of before image recovery processing. On the other hand, if the difference between the pixel signal value P0 of before image recovery processing and the pixel signal value P1 of after image recovery processing is equal to or less than the change amount limit value Lim (P0) of the pixel signal value P0, a pixel signal value P2 of after change amount limiting processing is the pixel signal value P1 of after image recovery processing.

Figure 5D:
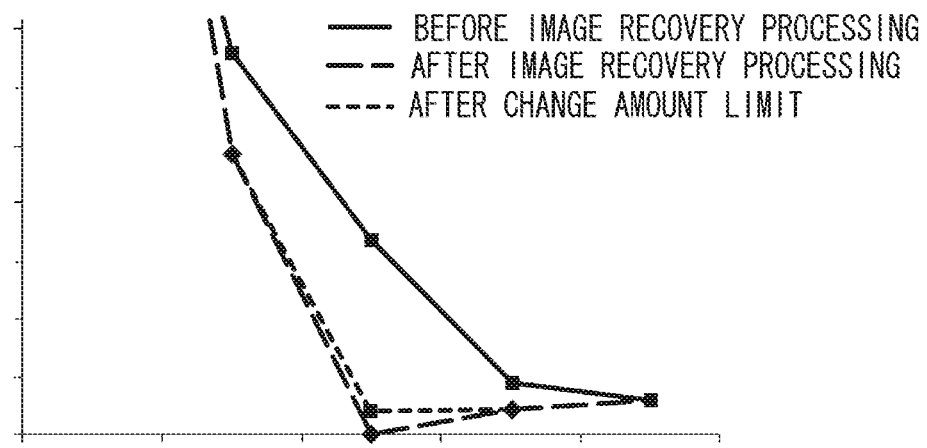
FIG. 5D illustrates an example of image data of after change amount limiting processing.
Figure 5E:
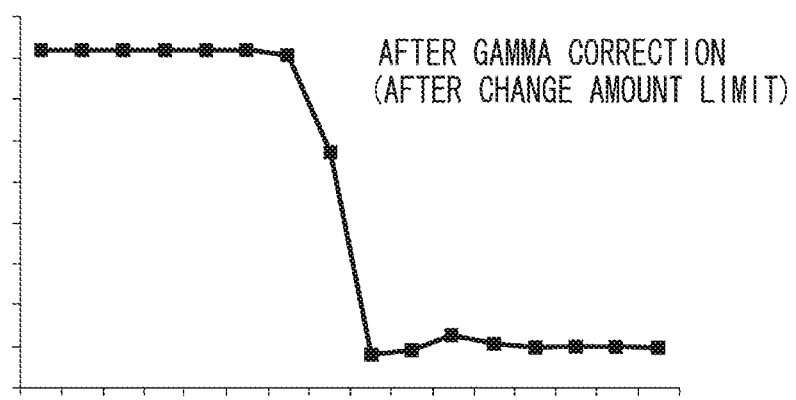
FIG. 5E illustrates an example of image data after gamma correction has been performed on image data of after change amount limiting processing.

FIG. 5D illustrates an example of a pixel signal value of after change amount limiting processing, in which the area enclosed by the rectangle of FIG. 5A has been expanded. FIG. 5E illustrates an example of a pixel signal value when gamma correction is executed in a state in which change amount limiting processing has been performed. It can be seen from FIG. 5E that the undershoot portion illustrated in FIG. 5C is reduced.

Although change amount limiting processing when the value is reduced by image recovery processing will be described here, change amount limiting processing when increasing the value can also be performed. Since the calculation of the change amount limit value in such a case is the same as when reducing the value, a description thereof will be omitted. When increasing the signal value by image recovery processing and the signal value change amount exceeds the limit value, a value obtained by adding the limit value to the pixel signal value of before image recovery processing serves as the signal value of after the change amount limiting processing.

In the flowchart illustrated in FIG. 2, the order for performing the change amount limit value calculation processing (step S203) and the image recovery processing (step S204) is not limited to that described above, and may be reversed. Specifically, the same result is obtained by storing the pixel signal value of before image recovery processing for step S204, performing the image recovery processing of step S204, then performing the change amount limit value calculation processing of step S203, and performing the change amount limiting processing of step S205 using the calculated change amount limit value.

The processing ends when the image processing has been performed on each of the pixels in the image data according to the flowchart of FIG. 2. In the above-described exemplary embodiment, the change amount limiting processing is performed on the entire image data for which image recovery processing has finished. As another exemplary embodiment, when performing image recovery processing on an individual pixel one by one in the image data, the signal value for the pixel can be determined by calculating the change amount limit value for the pixel and then performing change amount limiting processing using the change amount limit value.

Further, in the present exemplary embodiment, although a method for suppressing over recovery that occurs during image recovery processing for a saturated pixel portion was described, in the present invention over recovery that occurs during image recovery can be suppressed regardless of the reason. In addition, other processing, such as distortion correction processing, peripheral light amount correction processing, and noise reduction processing, can be performed before, during, or after the processing performed in the present exemplary embodiment. The image processing unit 104 stores image data that has been subjected to image recovery processing in a predetermined format in the image recording medium 109. The image data that is stored in the recording medium 109 is image data in which over recovery has been reduced by image recovery processing. Further, the image processing unit 104 can also perform predetermined display processing on image data of after image recovery processing, and then display the resultant image data on the display unit 105. A series of controls is performed by the system controller 110, and a mechanical drive in the imaging optical system is executed by the imaging optical system control unit 106 according to instructions from the system controller 110.

The aperture diameter of the diaphragm 101a is controlled as an F number imaging state setting. The position of the focus lens 101b is controlled by a (not illustrated) autofocus (AF) mechanism or a manual focus mechanism for adjusting the focus according to the object distance. The imaging optical system 101 may also include an optical element such as a low-pass filter and an infrared cut filter. However, when using an element that affects the characteristics of the OTF, such as a low-pass filter, it is desirable to consider the effects of such an optical element at the time of producing the image recovery filter. Since even an infrared cut filter has an effect on the respective PSF of the RGB channels, which are the integral of the PSF of the spectral wavelength, especially the PSF of the R channel, it is desirable to consider the effects of the infrared cut filter at the time of producing the image recovery filter.

Further, although the imaging optical system 101 is configured as a part of an imaging apparatus, the imaging optical system 101 can also be an interchangeable unit, as is found in a single lens reflex camera. In addition, since the OTF changes according to the angle of view (image height) of the imaging optical system even for a single imaging state, it is desirable to perform the image recovery processing by changing the OTF for each image data area that has been divided according to image height. The image recovery filter can also be successively changed for each image data area by scanning the image data while performing convolution processing.

Next, a second exemplary embodiment according to the present invention will be described. Since the configuration of the imaging apparatus according to the second exemplary embodiment is the same as the configuration illustrated in FIG. 1, in the following description the reference numerals shown in FIG. 1 will be used.

Figure 6:
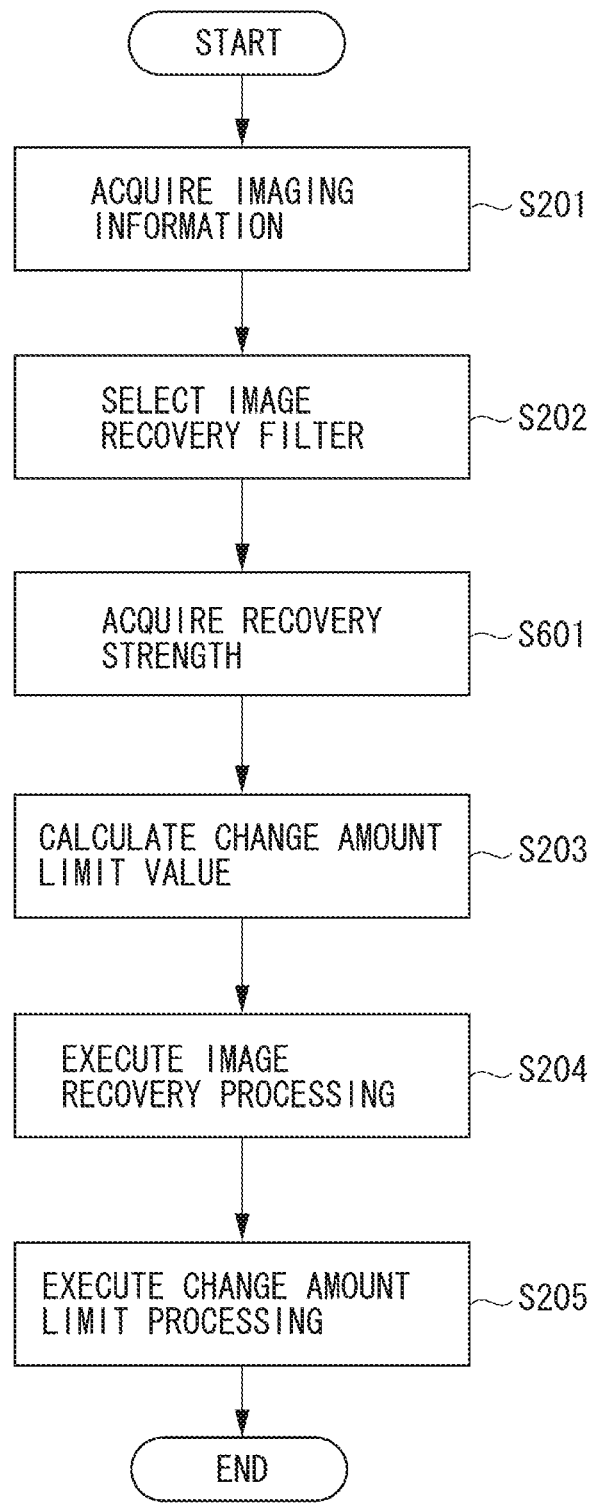
FIG. 6 is a flowchart illustrating image recovery processing that is executed by an image recovery processing unit according to a second exemplary embodiment of the present invention.

FIG. 6 is a flowchart illustrating image recovery processing that is executed by the image recovery processing unit 111 according to the second exemplary embodiment of the present invention. Steps S201, S202, S203, S204, and S205 in FIG. 6 respectively correspond to the processes denoted with the same reference numerals in FIG. 2. Accordingly, in the following a description of the portions that are common to the first exemplary embodiment will be omitted, and only those portions that are different will be described.

In step S202, the image recovery processing unit 111 selects an image recovery filter, and then in step S601 acquires a recovery strength. The recovery strength is a design value indicating the strength of image recovery processing that has been pre-set by the user. The recovery strength is designed so that the user can control so that the larger the value the greater the change amount of the pixel signal value by the image recovery processing. Further, the recovery strength is a value that is given to the image processing unit 104 from the system controller 110.

Figure 7:
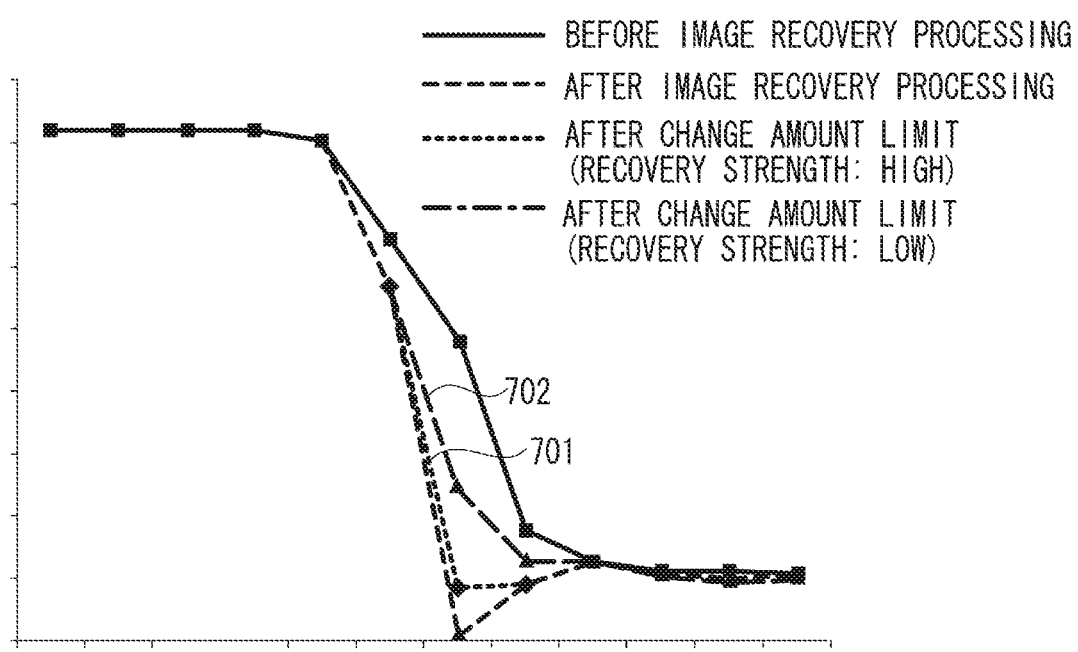
FIG. 7 illustrates set recovery strength and an improvement example of a blur component at an edge after image recovery processing.

In step S203, the image recovery processing unit 111 calculates the change amount limit value according to the acquired recovery strength. Specifically, the change permitted amount K after gamma correction illustrated in FIG. 4B is determined in conjunction with the recovery strength. The greater the recovery strength set by the user, the greater the change permitted amount K that is set. Consequently, the change amount limit value for reducing over recovery can be kept as low as possible, so that image data preferred by the user can be obtained by controlling the change amount based on image recovery processing. FIG. 7 illustrates set recovery strength and an improvement example of a blur component at an edge after image recovery processing. Specifically, curve 701 in FIG. 7 represents an improvement example of the blur component when the recovery strength is high, and curve 702 in FIG. 7 represents an improvement example of the blur component when the recovery strength is low. Further, curves 701 and 702 in FIG. 7 both represent image data of after gamma correction processing. Thus, in the present exemplary embodiment, the improvement state of the blur component at an edge can be changed by setting the recovery strength.

Although the above exemplary embodiments were described for an imaging apparatus, determination of the permitted change amount K according to setting of the recovery strength also works validly in an image processing apparatus. For example, in an image processing apparatus that records image data of before image processing that was captured in advance (output data from the A/D converter 103), and later displays the results of executing image recovery processing, since image data that was processed according to the change amount limit value corresponding to the set recovery strength is displayed, the user can determine a preferred recovery strength while confirming the displayed image data. Consequently, more accurate change amount limiting processing can be performed.

Figure 8:
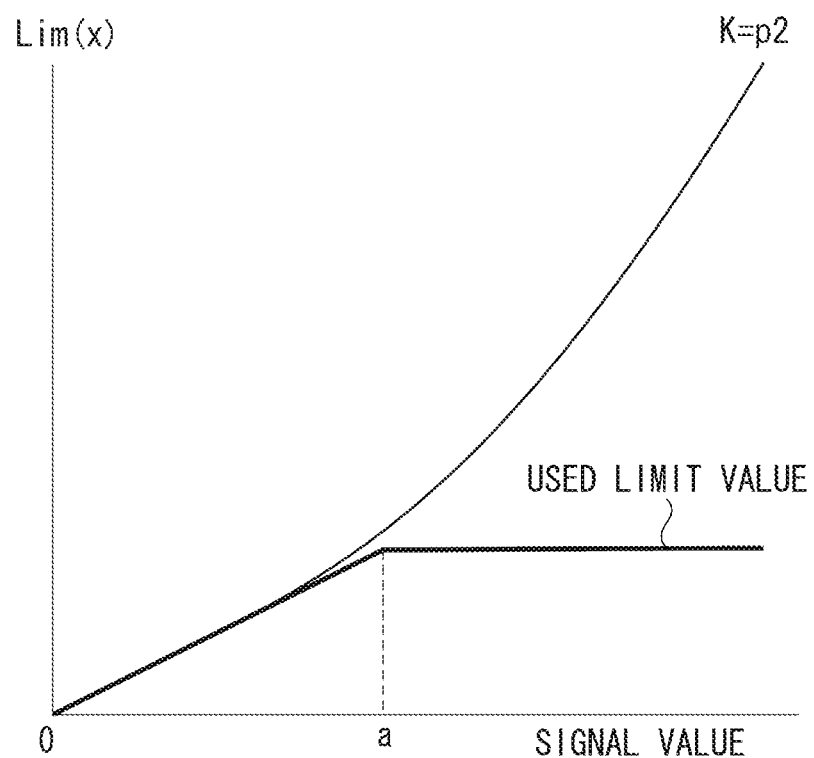
FIG. 8 illustrates another exemplary embodiment relating to change amount limit value calculation processing.

Another exemplary embodiment concerning the change amount limit value calculation processing performed in step S203 will now be described. As described above, since mainly the signal on the low luminance side is amplified by gamma correction, to reduce over recovery, limitation of the change amount especially on the low luminance side is important. Therefore, to emphasize the low luminance side, as illustrated in FIG. 8, the change amount limit value for an area of a predetermined threshold a or less is subjected to a straight-line approximation so that it monotonically increases, and the change amount limit value for an area greater than the threshold a is set as a constant value. Consequently, the change amount limit value characteristics are simple, and the calculation and management of the change amount limit value is simple, so that processing efficiency can be increased. If the change amount limit value can be varied according to the recovery strength set by the user, the threshold a can be varied in conjunction with the change permitted amount K. The change amount limit value can be controlled by increasing the threshold a the greater the recovery strength is.

Although exemplary embodiments of the present invention were described above, the present invention is not limited to used in an imaging apparatus. Various modifications and changes can be made within the gist of the invention. For example, the present invention may be used as an image processing software algorithm that runs on a personal computer (PC).

Aspects of the present invention can also be realized by a computer of a system or apparatus (or devices such as a CPU or MPU) that reads out and executes a program recorded on a memory device (computer-readable medium) to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-132376 filed Jun. 14, 2011, and Japanese Patent Application No. 2012-109907 filed May 11, 2012, each of which is hereby incorporated by reference herein in its entirety.

What is claimed is:

1. An image processing apparatus comprising:
an image recovery processing unit configured to perform image recovery processing, on image data captured by an imaging unit, using an image recovery filter corresponding to an imaging condition in the imaging unit; and
a limiting unit configured to, in a case where a difference between a post-image-recovery-processing signal value and a pre-image-recovery-processing signal value is greater than a limit value determined according to characteristics of a gamma correction processing that is applied after the image recovery processing, output a corrected signal value so that a difference between the corrected signal value and the pre-image-recovery-processing signal value is equal to or less than the limit value.

2. The image processing apparatus according to claim 1, wherein the image recovery processing unit is configured to apply a filter obtained by performing an inverse Fourier transform on the inverse of an optical transfer function of the imaging unit on the image data.

3. The image processing apparatus according to claim 1, wherein the limiting unit is configured to, in a case where a difference between the post-image-recovery-processing signal value and the pre-image-recovery-processing signal value is equal to or less than the limit value, output the post-image-recovery-processing signal value, and in a case where a difference between the post-image-recovery-processing signal value and the pre-image-recovery-processing signal value is greater than the limit value, output the corrected signal value obtained by adding or subtracting the limit value to the pre-image-recovery-processing signal value.

4. The image processing apparatus according to claim 1, wherein the limit value is also determined according to a pixel signal value of the image data.

5. The image processing apparatus according to claim 4, wherein the limit value is determined to be 0 when a pixel signal value of the image data is 0.

6. The image processing apparatus according to claim 4, wherein the limiting unit is configured to, in a case where the pixel signal value of the image data is equal to or less than a threshold, monotonically increase the limit value according to increase of the pixel signal value of the image data, and in a case where the pixel signal value of the image data is greater than the threshold, set the limit value at a constant value.

7. The image processing apparatus according to claim 1, further comprising an adjustment unit (111) configured to adjust the limit value.

8. The image processing apparatus according to claim 7, wherein the adjustment unit is configured to adjust the limit value according to an instruction from a user.

9. The image processing apparatus according to claim 7, further comprising a display unit configured to display an image using image data that includes the corrected signal value.

10. An image processing method comprising:
performing image recovery processing on image data captured by an imaging unit using an image recovery filter corresponding to an imaging condition in the imaging unit;
outputting, in a case where a difference between a post-image-recovery-processing signal value and a pre-image-recovery-processing signal value is greater than a limit value determined according to characteristics of a gamma correction processing that is applied after the image recovery processing, a corrected signal value so that a difference between the corrected signal value and the pre-image-recovery-processing signal value is equal to or less than the limit value.

11. A non-transitory computer-readable storage medium storing a program for causing the image processing apparatus to perform the method according to claim 10.

12. A non-transitory computer-readable storage medium storing a program for causing the image processing apparatus to function as the image processing apparatus according to claim 1.

* * * * *